US009460582B2

(12) United States Patent
Thomas

(10) Patent No.: US 9,460,582 B2
(45) Date of Patent: Oct. 4, 2016

(54) WAGERING GAME HAVING DISPLAY ARRANGEMENT FORMED BY AN IMAGE CONDUIT

(75) Inventor: Alfred Thomas, Las Vegas, NV (US)

(73) Assignee: Bally Gaming, Inc., Las Vegas, NV (US)

(*) Notice: Subject to any disclaimer, the term of this patent is extended or adjusted under 35 U.S.C. 154(b) by 1674 days.

(21) Appl. No.: 12/668,639

(22) PCT Filed: Jul. 9, 2008

(86) PCT No.: PCT/US2008/008398

§ 371 (c)(1), (2), (4) Date: Jan. 11, 2010

(87) PCT Pub. No.: WO2009/009058

PCT Pub. Date: Jan. 15, 2009

(65) Prior Publication Data

US 2010/0197378 A1 Aug. 5, 2010

Related U.S. Application Data

(60) Provisional application No. 60/959,130, filed on Jul. 11, 2007.

(51) Int. Cl.
*A63F 13/10* (2006.01)
*G07F 17/32* (2006.01)

(52) U.S. Cl.
CPC ....... *G07F 17/3211* (2013.01); *G07F 17/3213* (2013.01)

(58) Field of Classification Search
USPC ...................................................... 273/143 R
See application file for complete search history.

(56) References Cited

U.S. PATENT DOCUMENTS

| | | | | |
|---|---|---|---|---|
| 3,501,229 | A | 3/1970 | Dejoux | 352/91 |
| 4,306,768 | A | 12/1981 | Egging | 350/174 |
| 4,448,419 | A | 5/1984 | Telnaes | 463/21 |
| 4,454,670 | A | 6/1984 | Bachmann et al. | 40/584 |
| 4,517,558 | A | 5/1985 | Davids | 345/629 |

(Continued)

FOREIGN PATENT DOCUMENTS

| | | | |
|---|---|---|---|
| EP | 0060019 | 9/1982 | G06F 17/34 |
| EP | 0789338 | 8/1997 | G07F 17/32 |

(Continued)

OTHER PUBLICATIONS

Search Report corresponding to International Patent Application Serial No. PCT/US2008/008398, United States Patent Office; dated Nov. 10, 2008; 3 pages.
Written Opinion corresponding to International Patent Application Serial No. PCT/US2008/008398, United States Patent Office; dated Nov. 10, 2008; 6 pages.

(Continued)

*Primary Examiner* — Tramar Harper
(74) *Attorney, Agent, or Firm* — Nixon Peabody LLP

(57) ABSTRACT

A gaming system for conducting a wagering game comprises a display device and an image conduit. The display device develops or includes images of symbols associated with the wagering game. The image conduit is located in front of the display device and has a first end and a second end. The image conduit transmits the images from the second end to the first end of the image conduit. The images of the symbols appear at the first end such that a player perceives the symbols to be located at the first end of the image conduit. The display device can be a physical object with symbol indicia or a video display for displaying video images.

27 Claims, 6 Drawing Sheets

(56) References Cited

U.S. PATENT DOCUMENTS

| | | | | |
|---|---|---|---|---|
| 4,568,928 | A | 2/1986 | Biferno | 340/716 |
| 4,718,672 | A | 1/1988 | Okada | 463/20 |
| 4,875,144 | A | 10/1989 | Wainwright | 362/103 |
| 5,042,920 | A | 8/1991 | Yoshino et al. | 359/68 |
| 5,152,529 | A | 10/1992 | Okada | 463/20 |
| 5,205,555 | A | 4/1993 | Hamano | 273/143 |
| 5,283,560 | A | 2/1994 | Bartlett | 715/729 |
| 5,283,673 | A | 2/1994 | Murase et al. | 359/49 |
| 5,351,966 | A | 10/1994 | Tohyama et al. | 463/2 |
| 5,375,043 | A | 12/1994 | Tokunanga | 362/601 |
| 5,393,061 | A | 2/1995 | Manship et al. | 273/143 R |
| RE35,188 | E | 3/1996 | Howard | 273/143 |
| 5,580,055 | A * | 12/1996 | Hagiwara | 273/143 R |
| 5,697,843 | A | 12/1997 | Manship et al. | 463/20 |
| 5,722,891 | A | 3/1998 | Inoue | 463/20 |
| 5,725,210 | A | 3/1998 | Yamaguchi et al. | 273/121 |
| 5,752,881 | A | 5/1998 | Inoue | 463/20 |
| 5,810,665 | A | 9/1998 | Takemoto et al. | 463/31 |
| 5,818,998 | A | 10/1998 | Harris | 385/100 |
| 5,841,921 | A | 11/1998 | Wallace | 385/46 |
| 5,873,645 | A | 2/1999 | Belfer | 362/551 |
| 5,890,962 | A | 4/1999 | Takemoto | 463/20 |
| 5,911,024 | A | 6/1999 | Wallace | 385/120 |
| 5,934,672 | A | 8/1999 | Sines et al. | 273/143 |
| 5,980,384 | A | 11/1999 | Barrie | 463/16 |
| 6,027,115 | A | 2/2000 | Griswold et al. | 273/143 |
| 6,036,188 | A | 3/2000 | Gomez et al. | 273/118 |
| 6,038,188 | A | 3/2000 | Akamatsu | 365/226 |
| 6,056,642 | A | 5/2000 | Bennett | 463/20 |
| 6,068,552 | A | 5/2000 | Walker et al. | 463/21 |
| 6,086,066 | A | 7/2000 | Takeuchi et al. | 273/143 R |
| 6,089,977 | A | 7/2000 | Bennett | 463/20 |
| 6,095,921 | A | 8/2000 | Walker et al. | 463/20 |
| 6,135,884 | A | 10/2000 | Hedrick et al. | 463/20 |
| 6,135,885 | A | 10/2000 | Lermusiaux | 463/20 |
| 6,159,095 | A | 12/2000 | Frohm et al. | 463/19 |
| 6,164,645 | A | 12/2000 | Weiss | 273/138.2 |
| 6,181,301 | B1 | 1/2001 | Inoguchi et al. | 345/5 |
| 6,193,606 | B1 | 2/2001 | Walker et al. | 463/20 |
| 6,224,482 | B1 | 5/2001 | Bennett | 463/20 |
| 6,251,013 | B1 | 6/2001 | Bennett | 463/13 |
| 6,254,481 | B1 | 7/2001 | Jaffe | 463/20 |
| 6,261,177 | B1 | 7/2001 | Bennett | 463/16 |
| 6,270,411 | B1 | 8/2001 | Gura et al. | 463/20 |
| 6,290,600 | B1 | 9/2001 | Glasson | 463/20 |
| 6,311,974 | B1 | 11/2001 | Koga | 273/118 R |
| 6,348,905 | B1 | 2/2002 | Wang | 345/31 |
| 6,364,766 | B1 | 4/2002 | Anderson et al. | 463/16 |
| 6,368,216 | B1 | 4/2002 | Hedrick et al. | 463/20 |
| 6,375,568 | B1 | 4/2002 | Roffman et al. | 463/26 |
| 6,409,170 | B1 | 6/2002 | Sugimoto | 273/143 R |
| 6,419,579 | B1 | 7/2002 | Bennett | 463/20 |
| 6,443,586 | B1 | 9/2002 | Azima et al. | 362/86 |
| 6,471,387 | B1 | 10/2002 | Henshaw et al. | 362/555 |
| 6,497,617 | B1 | 12/2002 | Yoshida | 463/20 |
| 6,517,432 | B1 | 2/2003 | Jaffe | 463/16 |
| 6,517,433 | B2 | 2/2003 | Loose et al. | 463/20 |
| 6,538,714 | B1 | 3/2003 | Sahouani et al. | 349/194 |
| 6,592,238 | B2 | 7/2003 | Cleaver et al. | 362/249 |
| 6,618,528 | B2 | 9/2003 | Lowry | 385/120 |
| 6,628,867 | B1 | 9/2003 | Solntsev | 385/116 |
| 6,697,156 | B1 | 2/2004 | Karp | 356/364 |
| 6,742,776 | B2 | 6/2004 | Monsoon et al. | 267/136 |
| 6,811,273 | B2 * | 11/2004 | Satoh et al. | 362/27 |
| 6,817,946 | B2 | 11/2004 | Motegi et al. | 463/31 |
| 6,820,875 | B1 | 11/2004 | Hedrick et al. | 273/138.1 |
| 6,837,790 | B1 | 1/2005 | Kaminkow | 463/31 |
| 6,937,298 | B2 | 8/2005 | Okada | 349/58 |
| 7,097,560 | B2 | 8/2006 | Okada | 463/20 |
| 7,140,963 | B2 | 11/2006 | Kojima | 463/20 |
| 7,159,865 | B2 | 1/2007 | Okada | 273/143 |
| 7,160,187 | B2 | 1/2007 | Loose et al. | 463/20 |
| 7,166,029 | B2 | 1/2007 | Enzminger | 463/20 |
| 7,204,753 | B2 | 4/2007 | Ozaki et al. | 463/16 |
| 7,255,643 | B2 | 8/2007 | Ozaki et al. | 463/20 |
| 7,268,942 | B2 | 9/2007 | Kuo | 359/443 |
| 7,421,180 | B2 | 9/2008 | Kuo et al. | 385/133 |
| 7,452,276 | B2 | 11/2008 | Loose et al. | 463/31 |
| 7,654,899 | B2 | 2/2010 | Durham et al. | 463/30 |
| 7,727,069 | B1 * | 6/2010 | Nelson | 463/31 |
| 7,841,944 | B2 | 11/2010 | Wells | 463/37 |
| 7,942,745 | B2 | 5/2011 | Ikeda et al. | 463/38 |
| 8,096,878 | B2 | 1/2012 | Durham et al. | 463/31 |
| 8,128,477 | B2 | 3/2012 | Durham et al. | 463/17 |
| 2001/0000636 | A1 | 5/2001 | Weiss | 273/138.2 |
| 2001/0021011 | A1 | 9/2001 | Ono | 356/3 |
| 2001/0031658 | A1 | 10/2001 | Ozaki et al. | 463/16 |
| 2001/0049063 | A1 | 12/2001 | Cutter et al. | 430/5 |
| 2001/0054794 | A1 | 12/2001 | Cole et al. | 273/138.1 |
| 2002/0077172 | A1 | 6/2002 | Uchiyama et al. | 463/20 |
| 2002/0145682 | A1 | 10/2002 | Kwon et al. | 349/15 |
| 2002/0151360 | A1 | 10/2002 | Durham et al. | 463/30 |
| 2002/0173354 | A1 | 11/2002 | Winans et al. | 463/20 |
| 2002/0175466 | A1 * | 11/2002 | Loose et al. | 273/143 R |
| 2003/0017865 | A1 | 1/2003 | Beaulieu et al. | 463/16 |
| 2003/0032214 | A1 | 2/2003 | Huang | 438/50 |
| 2003/0032479 | A1 | 2/2003 | LeMay et al. | 463/32 |
| 2003/0060269 | A1 | 3/2003 | Paulsen et al. | 463/20 |
| 2003/0064799 | A1 * | 4/2003 | Goins et al. | 463/30 |
| 2003/0064814 | A1 | 4/2003 | Stephan et al. | 463/46 |
| 2003/0087690 | A1 | 5/2003 | Loose et al. | 463/20 |
| 2003/0095765 | A1 * | 5/2003 | Triba | 385/120 |
| 2003/0119577 | A1 | 6/2003 | Motegi et al. | 463/20 |
| 2003/0144051 | A1 | 7/2003 | Gauselmann | 463/20 |
| 2003/0157980 | A1 * | 8/2003 | Loose et al. | 463/20 |
| 2003/0176214 | A1 | 9/2003 | Burak et al. | 463/20 |
| 2003/0195035 | A1 * | 10/2003 | Onuki et al. | 463/20 |
| 2003/0234489 | A1 | 12/2003 | Okada | 273/236 |
| 2003/0236118 | A1 | 12/2003 | Okada | 463/20 |
| 2004/0012145 | A1 * | 1/2004 | Inoue | 273/143 R |
| 2004/0014520 | A1 | 1/2004 | Okada | 463/20 |
| 2004/0029636 | A1 | 2/2004 | Wells | 463/32 |
| 2004/0053663 | A1 | 3/2004 | Paulsen et al. | 463/16 |
| 2004/0053685 | A1 | 3/2004 | Seelig et al. | 463/25 |
| 2004/0063490 | A1 | 4/2004 | Okada | 463/20 |
| 2004/0082384 | A1 | 4/2004 | Walker et al. | 463/40 |
| 2004/0102241 | A1 | 5/2004 | Kaminkow | 463/20 |
| 2004/0116178 | A1 | 6/2004 | Okada | 463/20 |
| 2004/0132522 | A1 * | 7/2004 | Seelig et al. | 463/16 |
| 2004/0147303 | A1 | 7/2004 | Imura et al. | 463/16 |
| 2004/0150162 | A1 | 8/2004 | Okada | 273/292 |
| 2004/0152502 | A1 | 8/2004 | Okada | 463/16 |
| 2004/0166925 | A1 | 8/2004 | Emori et al. | 463/20 |
| 2004/0166926 | A1 | 8/2004 | Adachi et al. | 463/20 |
| 2004/0171418 | A1 | 9/2004 | Okada | 463/20 |
| 2004/0192430 | A1 | 9/2004 | Burak et al. | 463/20 |
| 2004/0198485 | A1 | 10/2004 | Loose et al. | 463/20 |
| 2004/0207154 | A1 | 10/2004 | Okada | 273/138.1 |
| 2004/0209666 | A1 | 10/2004 | Tashiro et al. | 463/20 |
| 2004/0209667 | A1 | 10/2004 | Emori et al. | 463/20 |
| 2004/0209668 | A1 | 10/2004 | Okada | 463/20 |
| 2004/0209670 | A1 | 10/2004 | Adachi et al. | 463/20 |
| 2004/0209671 | A1 | 10/2004 | Okada | 463/20 |
| 2004/0209672 | A1 | 10/2004 | Okada | 463/20 |
| 2004/0209678 | A1 | 10/2004 | Okada | 463/30 |
| 2004/0209681 | A1 | 10/2004 | Emori et al. | 463/31 |
| 2004/0209682 | A1 | 10/2004 | Okada | 463/31 |
| 2004/0214635 | A1 | 10/2004 | Okada | 463/30 |
| 2004/0214637 | A1 | 10/2004 | Nonaka | 463/31 |
| 2004/0219965 | A1 | 11/2004 | Okada | 463/16 |
| 2004/0224747 | A1 | 11/2004 | Okada | 463/16 |
| 2004/0224758 | A1 | 11/2004 | Okada et al. | 463/31 |
| 2004/0227286 | A1 | 11/2004 | Tanimura et al. | 273/143 |
| 2004/0227866 | A1 | 11/2004 | Okada | 349/58 |
| 2004/0229680 | A1 | 11/2004 | Hoshino et al. | 463/20 |
| 2004/0229686 | A1 | 11/2004 | Tanimura et al. | 463/30 |
| 2004/0259627 | A1 | 12/2004 | Walker et al. | |
| 2004/0266510 | A1 | 12/2004 | Kojima | 463/16 |
| 2004/0266515 | A1 | 12/2004 | Gauselmann | 463/20 |
| 2004/0266521 | A1 | 12/2004 | Kojima | 463/20 |
| 2005/0014548 | A1 * | 1/2005 | Thomas | 463/16 |
| 2005/0032571 | A1 | 2/2005 | Asonuma | 463/20 |
| 2005/0037843 | A1 * | 2/2005 | Wells et al. | 463/30 |
| 2005/0075167 | A1 | 4/2005 | Beaulieu et al. | 463/32 |

(56) References Cited

U.S. PATENT DOCUMENTS

| | | | | |
|---|---|---|---|---|
| 2005/0140088 | A1 | 6/2005 | Randall | 273/143 R |
| 2005/0153775 | A1 | 7/2005 | Griswold et al. | 463/30 |
| 2005/0153780 | A1 | 7/2005 | Gauselmann | 463/47 |
| 2005/0187003 | A1 | 8/2005 | Adachi et al. | 463/16 |
| 2005/0192090 | A1 | 9/2005 | Muir et al. | 463/30 |
| 2005/0233799 | A1 | 10/2005 | LeMay et al. | 463/20 |
| 2005/0255903 | A1* | 11/2005 | Jackson | 463/16 |
| 2005/0255907 | A1* | 11/2005 | Gauselmann et al. | 463/20 |
| 2005/0255908 | A1 | 11/2005 | Wells | 463/20 |
| 2005/0272500 | A1* | 12/2005 | Tanimura et al. | 463/20 |
| 2005/0277460 | A1* | 12/2005 | Inoue | 463/20 |
| 2005/0282616 | A1* | 12/2005 | Tanimura et al. | 463/20 |
| 2005/0282617 | A1 | 12/2005 | Sekiguchi et al. | 463/20 |
| 2005/0288090 | A1* | 12/2005 | Thomas et al. | 463/20 |
| 2006/0014580 | A1 | 1/2006 | Hawthorn | 463/20 |
| 2006/0058100 | A1 | 3/2006 | Pacey et al. | 463/31 |
| 2006/0100013 | A1 | 5/2006 | Enzminger et al. | 463/30 |
| 2006/0135248 | A1 | 6/2006 | Anderson et al. | 463/22 |
| 2006/0142080 | A1 | 6/2006 | Enzminger | |
| 2006/0199638 | A1* | 9/2006 | Walker et al. | 463/30 |
| 2006/0247041 | A1 | 11/2006 | Walker et al. | 463/29 |
| 2006/0251365 | A1* | 11/2006 | Brewer | 385/116 |
| 2006/0252496 | A1 | 11/2006 | Rasmussen | 463/20 |
| 2006/0281530 | A1 | 12/2006 | Seelig et al. | 463/20 |
| 2007/0004513 | A1* | 1/2007 | Wells et al. | 463/31 |
| 2007/0010318 | A1* | 1/2007 | Rigsby et al. | 463/20 |
| 2007/0019181 | A1 | 1/2007 | Sinclair et al. | 356/4.01 |
| 2007/0054730 | A1* | 3/2007 | Mattice et al. | 463/16 |
| 2007/0077986 | A1 | 4/2007 | Loose et al. | 463/20 |
| 2007/0093290 | A1 | 4/2007 | Winans et al. | |
| 2007/0099693 | A1* | 5/2007 | Nakashima | 463/22 |
| 2007/0149281 | A1 | 6/2007 | Gadda et al. | 463/34 |
| 2007/0178965 | A1* | 8/2007 | Inoue | 463/30 |
| 2007/0228651 | A1 | 10/2007 | Loose et al. | 463/16 |
| 2007/0237515 | A1* | 10/2007 | Wahlstrom | 396/287 |
| 2008/0039181 | A1 | 2/2008 | Loose et al. | 463/20 |
| 2008/0039182 | A1 | 2/2008 | Loose et al. | 463/20 |
| 2008/0039199 | A1 | 2/2008 | Baer et al. | 463/36 |
| 2008/0108422 | A1 | 5/2008 | Hedrick et al. | 463/22 |
| 2008/0113745 | A1 | 5/2008 | Williams et al. | 463/20 |
| 2008/0113746 | A1 | 5/2008 | Williams et al. | 463/20 |
| 2008/0113747 | A1 | 5/2008 | Williams et al. | 463/20 |
| 2008/0113748 | A1 | 5/2008 | Williams et al. | 463/20 |
| 2008/0113749 | A1 | 5/2008 | Williams et al. | 463/20 |
| 2008/0113755 | A1 | 5/2008 | Rasmussen et al. | 463/20 |
| 2008/0188304 | A1 | 8/2008 | Escalera et al. | 463/32 |
| 2008/0207303 | A1* | 8/2008 | Rasmussen | 463/20 |
| 2009/0075721 | A1 | 3/2009 | Pacey et al. | 463/20 |
| 2009/0149242 | A1* | 6/2009 | Woodard et al. | 463/21 |
| 2009/0286588 | A1* | 11/2009 | Jackson | 463/20 |
| 2009/0312095 | A1 | 12/2009 | Durham et al. | 463/30 |
| 2011/0281635 | A1 | 11/2011 | Loose et al. | 463/20 |

FOREIGN PATENT DOCUMENTS

| | | | | |
|---|---|---|---|---|
| EP | 0989531 | | 3/2000 | G07F 17/32 |
| GB | 2124505 | | 2/1984 | A63D 13/00 |
| GB | 2253299 | | 9/1992 | G07F 17/34 |
| GB | 2349494 | | 11/2000 | G07F 17/32 |
| JP | 61-279272 | | 12/1986 | A63F 7/02 |
| JP | 02-019182 | | 1/1990 | A63F 7/02 |
| JP | 04-109977 | | 4/1992 | A63F 5/04 |
| JP | 04-114676 | | 4/1992 | A63F 5/04 |
| JP | 04-341288 | | 11/1992 | A63F 7/02 |
| JP | 05-177043 | | 7/1993 | A63F 7/02 |
| JP | 06-039085 | | 2/1994 | A63F 5/04 |
| JP | 06-285236 | | 10/1994 | A63F 7/02 |
| JP | 07-016340 | | 1/1995 | A63F 7/02 |
| JP | 07-124290 | | 5/1995 | A63F 5/04 |
| JP | 07-299189 | | 11/1995 | A63F 7/02 |
| JP | 08-103541 | | 4/1996 | A63F 7/02 |
| JP | 08-164253 | | 6/1996 | A63F 7/02 |
| JP | 2531253 | | 1/1997 | A47F 11/06 |
| JP | 09-207625 | | 8/1997 | B60K 35/00 |
| JP | 10-071228 | | 3/1998 | A63F 5/04 |
| JP | 10-091076 | | 4/1998 | G09F 9/00 |
| JP | 10-305130 | | 11/1998 | A63F 5/04 |
| JP | 10-328398 | | 12/1998 | G07F 9/10 |
| JP | 11-090017 | | 4/1999 | A63F 7/02 |
| JP | 11-099240 | | 4/1999 | A63F 5/04 |
| JP | 11-137774 | | 5/1999 | A63F 5/04 |
| JP | 11-153970 | | 6/1999 | G09F 9/33 |
| JP | 11-244451 | | 9/1999 | G63F 5/04 |
| JP | 2000061033 | A * | 2/2000 | |
| JP | 2000-262738 | | 9/2000 | A63F 13/00 |
| JP | 2001-252394 | | 6/2001 | A63F 5/04 |
| JP | 2001-238995 | | 9/2001 | A63F 5/04 |
| JP | 2001-252393 | | 9/2001 | A63F 5/04 |
| JP | 2002-113150 | | 4/2002 | A63F 5/04 |
| JP | 2003039583 | A * | 2/2003 | |
| WO | 99/53454 | | 10/1999 | G07F 17/34 |
| WO | 99/64997 | | 12/1999 | G07F 17/34 |
| WO | 00/32286 | | 6/2000 | A63F 9/22 |
| WO | 01/34262 | | 5/2001 | A63F 13/08 |
| WO | 03/089080 | | 10/2003 | G07F 17/32 |
| WO | 2006/036948 | | 4/2006 | A63F 9/24 |
| WO | 2006/039371 | | 4/2006 | A63F 9/24 |
| WO | 2006/124976 | | 11/2006 | A63F 13/00 |
| WO | 2007/005846 | | 1/2007 | A61N 1/05 |
| WO | 2007/011717 | | 1/2007 | G06F 19/00 |
| WO | 2007/030781 | | 3/2007 | A63F 9/24 |

OTHER PUBLICATIONS

"Bigfoot" Product Sheet, Shuffle Master, Inc., 1 page (2000).
"Big Games Safari" Product Sheet, IGT, 24 pages (2000).
"Cabby Cash™" Product Sheet, Anchor Gaming, 2 pages (2000).
"Congo Quest™" Product Sheet, Anchor Gaming, 2 pages (2000).
"Fishin' Buddies™" Product Sheet, Anchor Gaming, 2 pages (2000).
"Goooaal!" Product Sheet, Bally Gaming, Inc., 2 pages (2000).
"Great Whites" Product Sheet, VLC, Inc., 2 pages (2000).
"Jackpot Stampede Deluxe™" Product Sheet, WMS Gaming Inc., 2 pages (1997).
"Light-emitting diode", (http://en.wikipedia.org/wiki/Light-emitting_diode) 13 pp., Oct. 14, 2006.
"Liquid Crystal Display", (http://en.wikipedia.org/wiki/Liquid_crystal_display) 8 pp., Oct. 14, 2006.
"Loaded Dice" Product Sheet, Konami Gaming, 2 pages (2000).
"Neptune's Pearls" Product Sheet, Unidesa Gaming, 4 pages (1998).
"Optics", (http://en.wikipedia.org/wiki/Optics) 5 pp., Oct. 14, 2006.
"Penguin Pays" Product Sheet, Aristocrat Incorporated, 2 pages (1998).
"Prism (optics)", (http://en.wikipedia.org/wiki/Prism_%28optics%29) 2 pp., Oct. 14, 2006.
"Rear-Projection HDTV Microdisplays Fire Back" Technology Report of May 11, 2006, (http://www.electronicdesign.com/Articles/Print.cfm?AD=1&ArticleID=12441) .9 pp., Oct. 14, 2006.
"Stroke of Luck™" Product Sheet, WMS Gaming Inc., 2 pages (1997).
"The Microdisplay Page . . . your guide to microdisplay development around the world", (http://tfcg.elis.ugent.be/microdis) 10 pp., Oct. 14, 2006.
"The Other Microdisplay" Technology Report of May 11, 2006, (http://www.electronicdesign.com/Articles/Print.cfm?AD=1&ArticleID=12440) 3 pp., Oct. 14, 2006.
"Wild Cougar" Article, Strictly Slots, p. 44 (Feb. 1999).
"Yahtzee® Brand Video Game" Product Brochure, Hasbro, Inc., 2 pages (2000).
Article for "Flip Flop", Strictly Slots, p. 48, Jun. 2000.
Article for "The Pink Panther", *Strictly Slots*, p. 50, Feb. 2001.
Article, "Microdisplays Move Outside the Box," *Spie's OE Magazine*, Nov. 2002; 3 pgs.
Brochure for "3RV", WMS Gaming Inc., Waukegan, IL, 2 pages, undated.
Legato, Frank, "The Full Monty," Strictly Slots, pp. 48-50 (Jun. 1999).

* cited by examiner

WAGERING GAME HAVING DISPLAY ARRANGEMENT FORMED BY AN IMAGE CONDUIT

CROSS REFERENCE TO RELATED APPLICATIONS

This application is a U.S. national stage of International Application No. PCT/US2008/008398, titled "Wagering Game Having Display Arrangement Formed By An Image Conduit" and filed Jul. 9, 2008, which claims priority to U.S. Provisional Patent Application Ser. No. 60/959,130, titled Wagering Game Having Display Arrangement Formed By An Image Conduit" and filed on Jul. 11, 2007, each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering games and, in particular, to the use of a display arrangement having an image conduit to transmit the images of symbols and other information to the player during the wagering game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

In any wagering game, the symbols and other information that are required to play the wagering game must be easily visualized by the player. The display arrangement used to display the information is typically in the line-of-sight of the player. However, in some instances, the display mechanism for producing the mages of the symbols and other information is out of the line-of-sight of the player, and the images are transmitted through various optical devices, such as fiber optic bundles or light pipes. However, there are problems with these prior art image-transmission devices. For example, the image does not appear to the player to be located at the end surface of the image-transmission device. And, the images can be somewhat distorted. A need exists for an optical device that can transmit the images of the symbols from the wagering game to a known location on an exposed display surface on the optical device and in a substantially distortion-free manner.

SUMMARY OF THE INVENTION

According to one aspect of the present invention, a gaming machine for conducting a wagering game includes a video display and an image conduit. The video display develops a video image of symbols for indicating a randomly selected outcome of the wagering game. The image conduit has a first end and a second end opposing the first end. The second end is adjacent to the video display. The video image of the symbols appears at the first end such that a player perceives the symbols to be located at the first end of the image conduit.

According to another aspect of the invention, a method of conducting a wagering game on a gaming system comprises developing a video image of symbols for indicating a randomly selected outcome of the wagering game, and transmitting the video image into an image conduit having a first end and a second end opposing the first end. The video image is transmitted into the second end of the image conduit. The method further includes displaying the video image from the first end of the image conduit such that a player perceives the video image to be located at the first end of the image conduit.

According to yet another aspect of the invention, a gaming system for conducting a wagering game comprises a display device and an image conduit. The display device develops images of symbols associated with the wagering game. The image conduit is located in front of the display device and has a first end and a second end. The image conduit transmits the images from the second end to the first end of the image conduit. The images of the symbols appear at the first end such that a player perceives the symbols to be located at the first end of the image conduit. The display device can be a physical object with symbol indicia or a video display.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
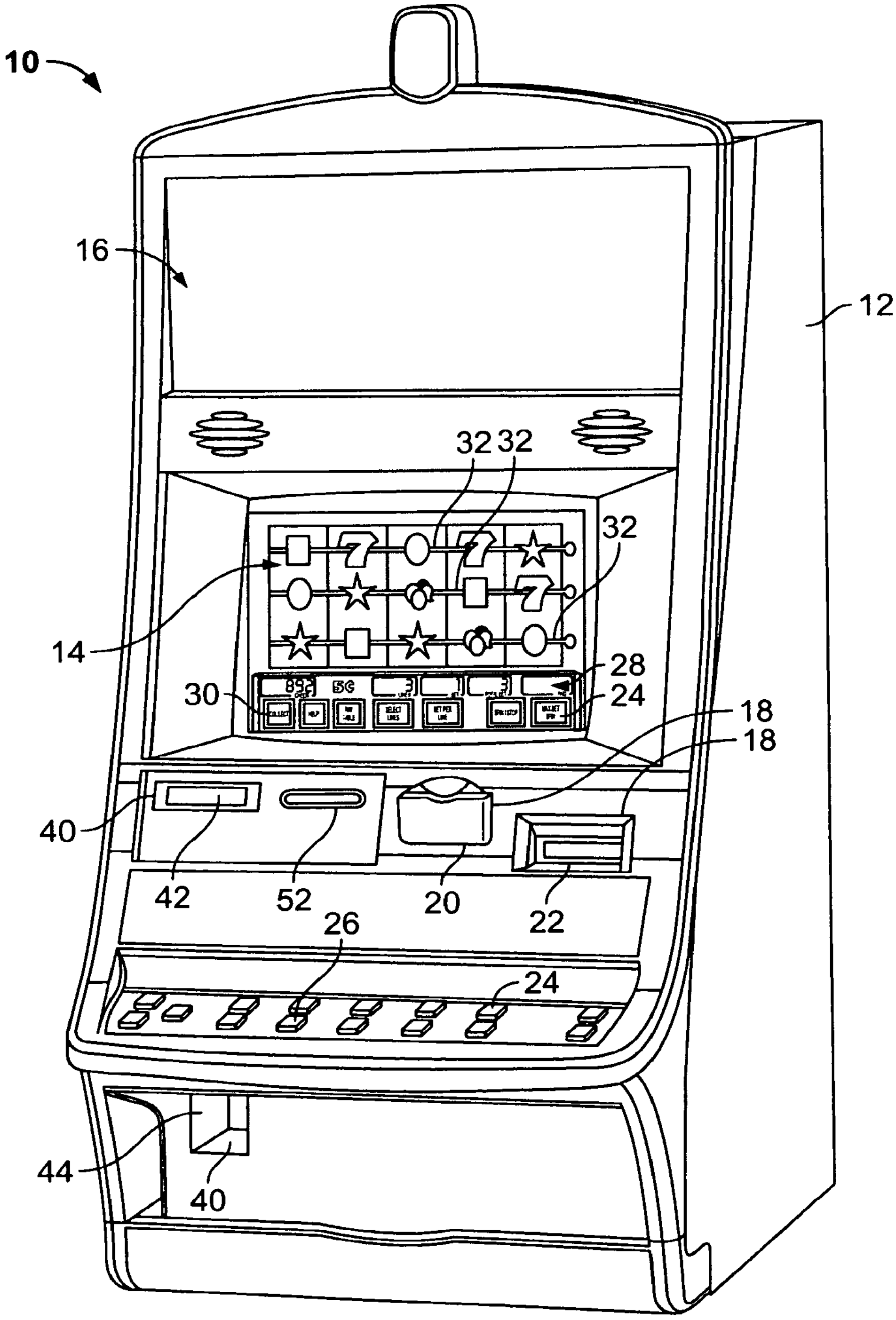
FIG. 1*a* is a perspective view of a free standing gaming machine.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the base wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the base wagering game is displayed to the player on the primary display 14. The primary display 14 can also display the bonus game associated with the base wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the base wagering game by making a wager via the value input device 18 of the gaming machine 10. A player can select play by using the player input device 24, via the buttons 26 or the touch screen keys 30. The base game consists of a plurality of symbols arranged in an array, and includes at least one payline 32 that indicates one or more outcomes of the base game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information.

Also, in some embodiments, the information reader 52 may be used to restore game assets that the player achieved and saved during a previous game session. Assets may be any number of things, including, but not limited to, monetary or non-monetary awards, features that a player builds up in a base, bonus or progressive game to win awards, etc. Monetary awards can include game credits or money. Non-monetary awards, or wagering-game enhancement parameters, can be free plays (e.g., free spins), extended game play, multipliers, wild reels, multiplying wilds, access to bonus and/or progressive games, or any such wagering-game enhancement parameters that allow players to receive additional or bonus awards.

Figure 1B:
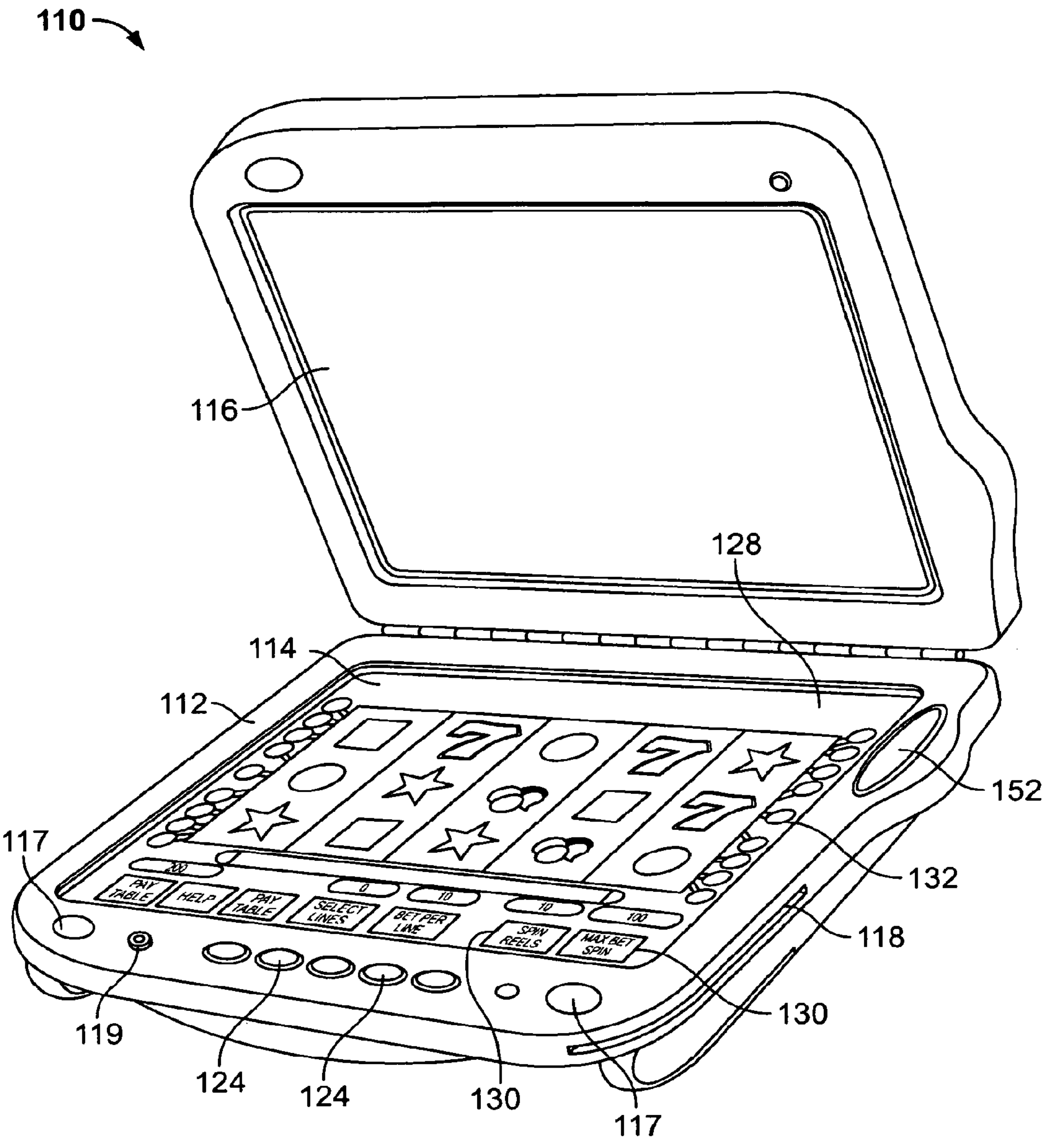
FIG. 1*b* is a perspective view of a handheld gaming machine.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons 126 on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the base wagering game on the handheld gaming machine 110 is displayed to the player on the primary display 114. The primary display 114 can also display the bonus game associated with the base wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the base wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 10. In at least some aspects, the base game may comprise a plurality of symbols arranged in an array, and includes at least one payline 132 that indicates one or more outcomes of the base game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1, comprises a biometric sensing device.

Figure 2:
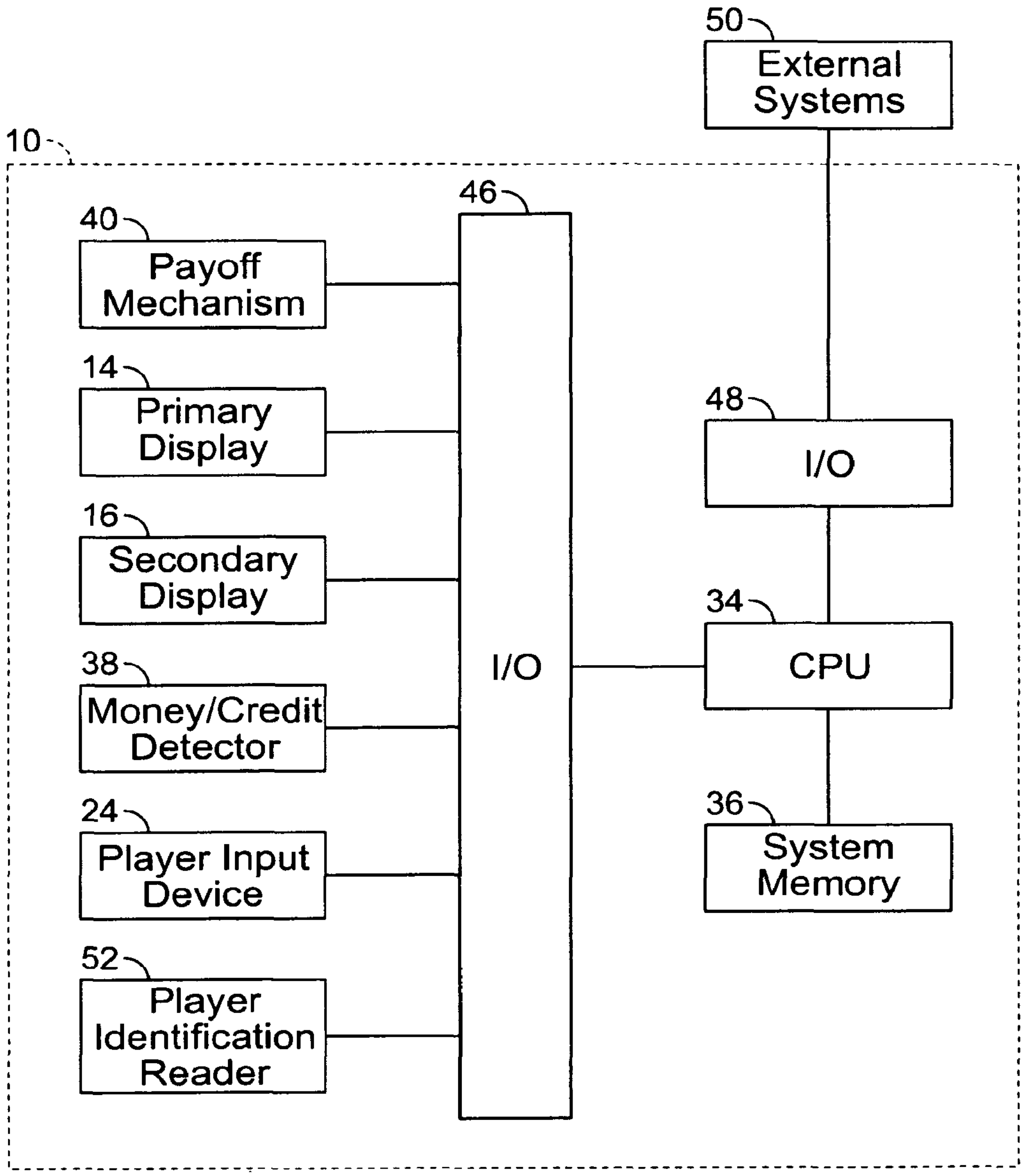
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the base game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Security features are advantageously utilized where the gaming machines 10,110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, Establishing Wireless Robust Security Networks: A Guide TO IEEE 802.11, and SP 800-48, Wireless Network Security: 802.11, Bluetooth and Handheld Devices, both of which are incorporated herein by reference in their entirety.

Figure 3A:
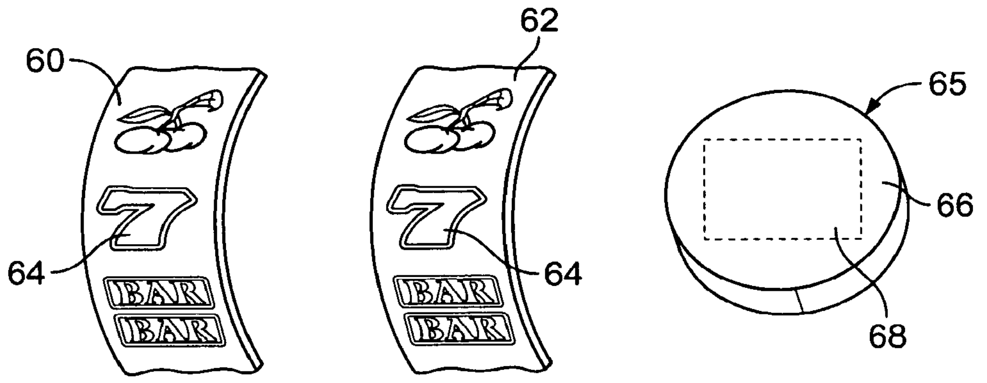
FIGS. 3A and 3B are top views of reels strips that illustrate the effect of an image conduit.
Figure 3B:
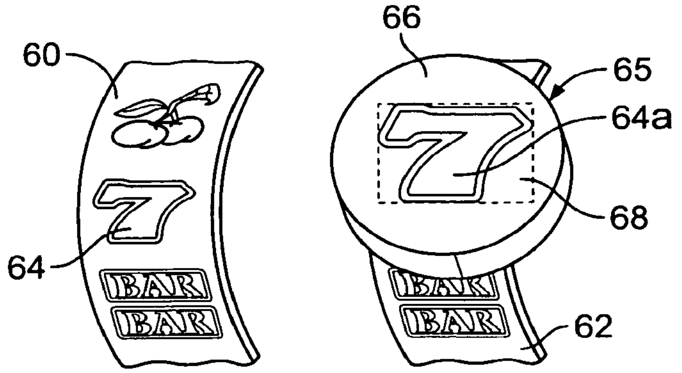

In FIG. 3A and 3B, two reel strips 60, 62 are illustrated side by side. Each of the two reel strips 60, 62 includes a "7" symbol 64 as the middle displayed symbol. FIGS. 3A and 3B also illustrate an image conduit 65 that has a lower surface (not shown) and an upper surface 66. The upper surface 66 of the image conduit 65 includes a display region 68 that may be located on all, or a portion, of the upper surface 66. As shown, the display region 68 is located in the central region of the upper surface 66 and includes about 50% of the area of the upper surface 66.

When the image conduit 65 is moved from a position away from the reel strip 62 (FIG. 3A) to a position over the top of the "7" symbol 64 on the reel strip 62 (FIG. 3B), the image of the "7" symbol 64 on the reel strip 62 is transmitted through the image conduit 65 and appears on the upper surface 66 of the image conduit 65 within the display region 68. Notably, after the image is transmitted, the "7" symbol 64 on the reel strip 62 appears as a modified "7" symbol 64*a* at the display region 68. As shown, the modification to the image of the "7" symbol 64 is a magnification, thereby causing the modified "7" symbol 64*a* to appear larger than the underlying "7" symbol 64. While the image of the symbol 64 has been transmitted through the image conduit 65 to produce a modified "7" symbol, other types of image conduits 65 can be used to create a substantially unmodified symbol at the upper surface 66. Further, while FIG. 3 illustrates the use of the image conduit 65 on symbols from a physical object (i.e., the reel strip 62), the images to be transmitted through the image conduit 65 to its upper surface 66 can also be developed by video display devices.

From the player's perspective, the modified "7" symbol 64*a* appears as if it is located at the upper surface 66 of the image conduit 65, rather than appearing to be located within the image conduit 65 at some arbitrary depth below the upper surface 68. That is one of the distinct advantages of the image conduit 65 as it is applied to wagering games and gaming systems. For all intents and purposes, the player perceives the upper surface 66 of the image conduit 65 as the "display device" even though actual display device (Le., the reel strip 62 in FIGS. 3A and 3B) is located at a further distance away from the player. Prior art uses of various optical structures, such as light pipes and fiber optic bundles (See e.g., U.S. Publication No. 2003-0157980) would often not provide the same type of appearance to the player as the images would appear to be located within the optical structure.

The image conduit 65 is also a passive device in that it utilizes ambient light from the surfaces between the upper and lower surfaces to help illuminate the image that is ultimately displayed at the upper surface 66. Other types of prior art devices used in gaming machines typically require the object to be back-illuminated, such as what occurs in a video display.

The image conduit 65 can be made by fusing a multitude of small-diameter fibers. If it is elongated, the image conduit 65 can often be shaped by a heating process. One supplier of image conduits is Schott North America, Inc. of Massachusetts. Compared to the image conduit 65 comprised of integrated, fused fibers, those prior art devices mentioned above are more prone to distortions of the images because of the fact that fibers are not necessarily bonded together in the same way as the image conduits in accordance to the present invention. As such, the term "image conduit" as used in the present application is a device formed by the fusing process of a plurality of fibers, and specifically excludes fiber optic bundles or light pipes.

Figure 4:
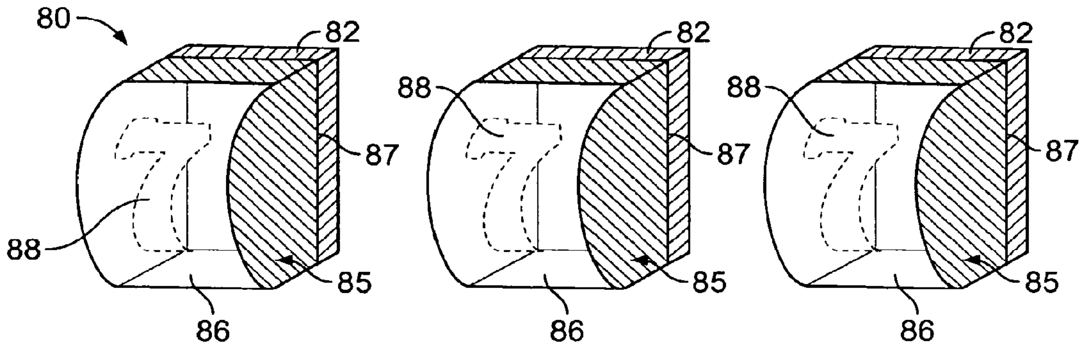
FIG. 4 is a perspective view of three image conduits placed over three video displays.

FIG. 4 illustrates a display arrangement 80 for a wagering game to be played on a gaming machine (e.g., the gaming machine 10 in FIG. 1A or the gaming machine 110 in FIG. 1B). The display arrangement 80 includes three video displays 82, which can be one of any variety of display devices (e.g., an LCD display). The video displays 82 provide video images that are transmitted through three image conduits 85. Each of the image conduits 85 includes a first end 86 and a second end 87 opposing the first end 86. Unlike the previous embodiment of FIGS. 3A and 3B, the first ends 86 of the three conduits 85 are curved to simulate the curvature of mechanical reels that are typically found in slot machines. For example, the radii of curvature of the first ends 86 are about 4 to 7 inches.

The images of the video displays 82 are displayed at the first ends 86 of the image conduits 85 as three "7" symbols 88. These symbols 88 would be used to indicate the randomly selected outcome of the wagering game being played at the gaming machine. As discussed above, from the player's visual perspective, the "7" symbols 88 appear to be located at the first ends 86 of the image conduits 85. These symbols 88 can be selectively moved along the first ends 86 as the images produced by the video displays 82 are moved (e.g., moved to simulate a mechanical reel).

Figure 5:
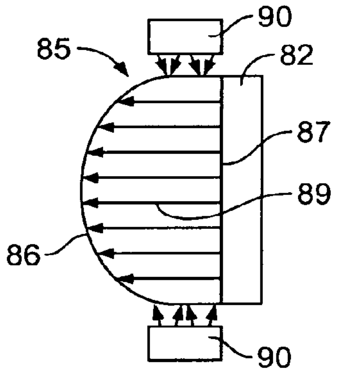
FIG. 5 is a side view of one of the image conduits and the associated video display of FIG. 4.

FIG. 5 illustrates a side view of one of the image conduits 85 of FIG. 4. As shown, the image conduit 85 transmits the images 89 (schematically depicted as arrows) from the video display 82 to produce the "7" symbol 88 (FIG. 4) at the first end 86 of the image conduit 85. While the second end 87 is shown as contacting the video display 82, the second end 87 can be spaced away from the video display 82.

FIG. 5 also illustrates a light system 90 that may be located along one or more side surfaces of the image conduit 85. As indicated above, the image conduit 85 is a passive device that uses the ambient light to help illuminate the symbol displayed by the video display 82. As such, the video display 82 does not necessarily need to provide a high level of brightness. However, in some situations, it may be preferable to control the exact level of brightness of the symbol 88 that appears at the end 86 of the image conduit 86, especially if not much ambient light is present or is inconsistently available. Accordingly, the light system 90 can provide a known and consistent level of light to ensure that the symbol 88 appears crisply.

Additionally, the light system 90 can be selectively controlled (e.g., by the CPU 34 in FIG. 2) to create additional lighting effects when certain events occur in the wagering game at that specific gaming machine, or somewhere throughout the gaming system. For example, the lighting system 90 can provide different colors when a winning symbol combination is achieved. Thus, the light system 90 can affect the images 89 of the symbol as they pass through the image conduit 86. In short, the light system 90 and the video display 82 can work together to provide extra symbols enhancements during the wagering game.

Figure 6A:
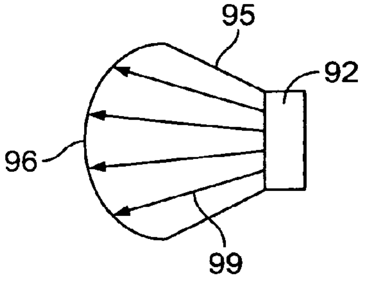
FIGS. 6A and 6B are side views of alternative embodiments using image conduits to modify the underlying video image from a video display.
Figure 6B:
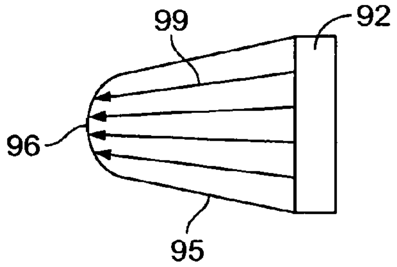

FIGS. 6A and 6B illustrate alternative embodiments of a display arrangement according to the present invention. In particular, a video display device 92 and an image conduit 95 work together to create symbols at the first end 96 of the image conduit 95. In FIG. 6A, the images 99 produced by the video display 92 are enlarged (i.e., magnified) to create larger symbols at the first end 96 of the image conduit 95. In FIG. 6B, the images 99 produced by the video display 92 are reduced to create smaller symbols at the first end 96 of the image conduit 95. While the side views in FIGS. 6A and 6B show modification in only one dimension, the magnification or reduction can be in two dimensions.

Figure 7:
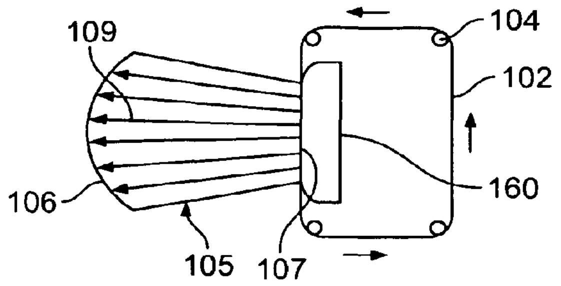
FIG. 7 is a side view of an image conduit used in conjunction with a symbols on a physical device, which is a moveable reel strip in the example of FIG. 7.

FIG. 7 illustrates a further alternative embodiment of the display arrangement, which is similar to FIG. 3 in that it involves the display device being a physical object having symbol indicia thereon. In FIG. 7, a reel strip 102 is rotated around a plurality of rollers 104 in a selectively controlled fashion (e.g., the CPU 34 in FIG. 2). One of the rollers 104 can be a drive roller to impart movement to the reels strip 102, or other drive mechanisms can be used to impart the motion to the reel strip 102. An image conduit 105 transmits images 109 of the symbols on the reel strip 102 (e.g., like the symbols on reel strip 62 in FIG. 3) to a first end 106 of the image conduit 105. The reel strip 102 moves between a second end 107 of the image conduit 105 and a mounting structure 160 to cause the symbol indicia on the reel strip 102 to be directly adjacent to the second end 107 of the image conduit 105.

The mounting structure 160 can also serve other functions that assist with the display of the symbols at the second end 106 of the image conduit 105. While the image conduit 105 is passive in that it utilizes the ambient light transmitted into its various surfaces to help illuminate the symbols on the reel strip 102 and provide vivid symbols at the first end 106, the mounting structure 160 can also incorporate lighting (e.g., LEDs) to illuminate the back side of the reel strip 102. In such an embodiment, the reel strip 102 must be somewhat translucent to allow the visual enhancement created by the lighting on the mounting structure. It should be noted that other forms of lighting can be used at other locations along the side surfaces of the image conduit 105. For example, as indicated in FIG. 5, the lighting system can be located along the side surfaces and can be selectively controlled to enhance (e.g., by adding color or a strobing effect) the symbols displayed to the player at the first end 106.

The mounting structure 160 can also include other devices for maintaining a constant distance between the reel strip 102 and the second surface 107. For example, the reel strip 102 can include an iron-based material at its peripheral edges and the mounting structure 160 may contain one or more permanent magnets to hold the moving reel strip 102 against the abutting surface of the mounting structure 160.

Alternatively, the image conduit 105 may include a separate end bracket adjacent to the second end 107. The end bracket may include a magnet to keep the moving reel strip 102 at a constant location relative to (and possible contacting) the second end 107 of the image conduit 105. In this alternative, the separate mounting structure 160 may be unnecessary.

The physical object (i.e., the reel strip) of FIG. 7 can also be "electronic paper," which, unlike a video display, relies upon the reflection of ambient light to display the images on its surface to the player. Thus, the reel strip 102 can be replaced by monochromatic or polychromatic electronic paper, which has images on a surface thereof that are transmitted through the image conduit 106. The electronic paper could be used to display other various wagering games, such as video poker or keno, to the player.

Figure 8:
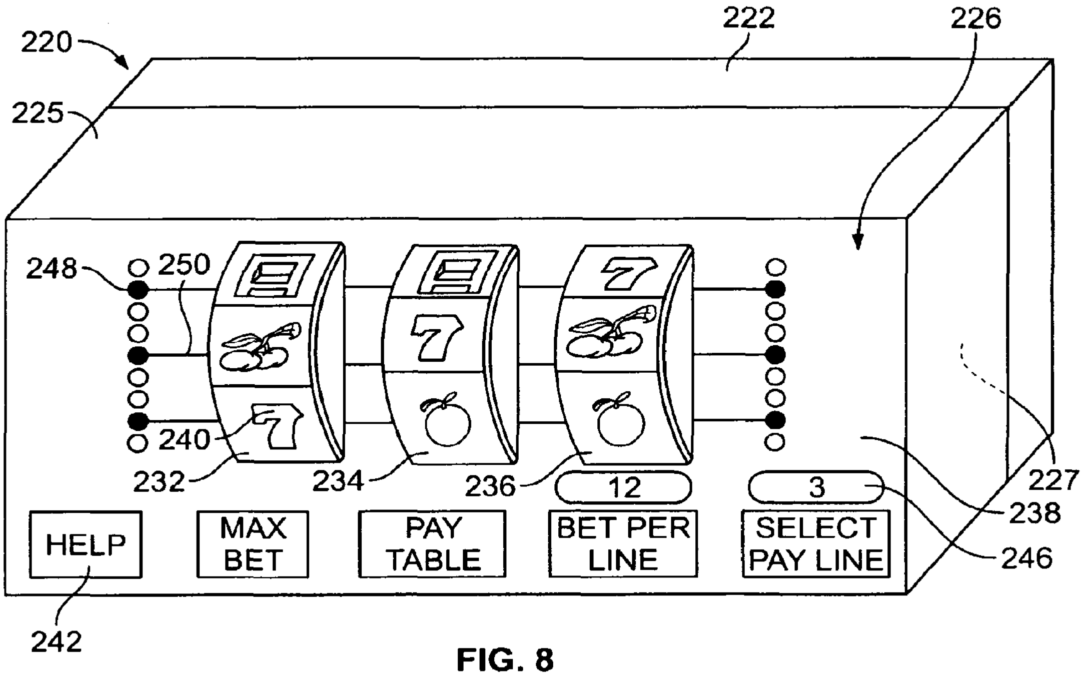
FIG. 8 is a perspective view of a more complex display arrangement in which an image conduit has multiple display surfaces for displaying various game information.

FIG. 8 illustrates a more complex display arrangement 220 for a gaming machine that utilizes a video display 222 and an image conduit 225. The image conduit 225 has a first end 226 and a second end 227 that opposes the first end 226.

The second end 227 is adjacent to the video display 222 and receives images therefrom for transmission to the first end 226.

The first end 226 includes multiple surfaces such that the player viewing the display arrangement 200 perceives symbols at different depths. The first end 226 includes three curved surfaces 232, 234, 236 to simulate mechanical reels. The primary surface 238 from which the curved surfaces 232, 234, 236 extend also includes symbols for playing the wagering game. In particular, the curved surfaces 232, 234, 236 include symbols 240 for indicating the randomly selected outcome of the wagering game. The primary surface 238 also includes symbols 242 (e.g. alpha-numerics) associated with game information or player inputs for playing the wagering game. In the situation where player inputs are required, a touch screen can be placed over the first end 226, or only at locations where player inputs are needed (e.g., the lower portion of the primary surface 238).

The primary surface 238 also includes symbols 246 associated with meters used for informing the player of the number of paylines that he or she has selected, and the wager per payline. If the wagering game is a slots-type of game, the primary surface 238 can display the payline indicators 248 and the paylines 250 selected by the player (here, shown as three selected paylines, with the maximum being nine paylines). Other meters, such as a credit meter, can be displayed as well. The first end 226 may include blacked-out regions where no information or symbols are to be displayed to the player.

It should be noted that the single video display 222 can be removed and replaced by multiple video displays. Each of the multiple video displays can be used for controlling the outcome-indicating symbols and informational symbols at a certain location on the first end 226. In other words, each of the multiple displays serves a specific function for producing certain symbols that are used during the wagering game.

Figure 9:
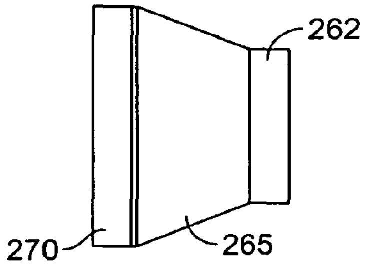
FIG. 9 is a side view of an image conduit used in conjunction with a video display and a transmissive display.

FIG. 9 illustrates an alternative embodiment having multiple displays for displaying symbols associated with a wagering game. In FIG. 9, a video display 262 projects images through an image conduit 265. Additionally, a transmissive display 270 is located at the opposing end of the image conduit 265. The transmissive display 270 permits a player to see the symbols at the end of the image conduit 265 because it is “transmissive.” However, the transmissive display 270 can be selectively controlled to produce enhancements to the symbols and information provided by the video display 262 via the image conduit 265, or to provide entirely new symbols and information. Further, the transmissive display 270 can be located on only portions of the end surface(s) of the image conduit 270. The transmissive display 270 can also include portions along the side surface of the image conduit 265 to provide enhanced lighting effects in a manner that is similar to the lighting system 90 of FIG. 5. Examples of transmisive displays 270 and their functionality in wagering games can be found in PCT Published Application WO2007/005846 and U.S. Pat. No. 7,160,187, both of which are incorporated by reference in their entireties.

In any of the embodiments described above, a controller controls the output of the video display that transmits images into the image conduit. The controller can be the gaming machine controller serving multiple functions (e.g., CPU 34) or one that is dedicated to the video display of the gaming machine. While the image conduit may transmit images in a substantially distortion-free manner, the image conduit may provide some image modifications as the images pass therethrough, especially when the end surface is curved (e.g., the surfaces 232, 234, or 236 in FIG. 8). Because the image conduit is a passive device, any such distortions are fixed and constant and can be compensated for by the controller controlling the video output from the video display.

Each of these embodiments and obvious variations thereof is contemplated as falling within the spirit and scope of the claimed invention, which is set forth in the following claims.

What is claimed is:

1. A gaming machine for conducting a wagering game, comprising:

a non-emissive physical object having a symbol-bearing surface with symbols for indicating a randomly selected outcome of said wagering game; and an image conduit having a first end and a second end opposing said first end, said second end being adjacent to said symbol-bearing surface, said symbols appearing at said first end such that a player perceives said symbols to be located at said first end of said image conduit, said first end has first and second surfaces that are at different distances from said symbol-bearing surface, said symbols appearing to said player on said first surface, additional game indicia for said wagering game being located on said second surface.

2. The machine of claim 1, wherein said first end includes a curved section.

3. The machine of claim 2, wherein a radius of curvature of said curved section is about 4 to 7 inches to approximate a mechanical reel.

4. The machine of claim 1, further including a touch screen overlying at least a portion of said first end, said player providing inputs related to said wagering game via said touch screen.

5. The machine of claim 1, further including a light system transmitting light into a surface of said image conduit to help illuminate said symbols, said surface located between said first and second ends.

6. The machine of claim 5, wherein said light system is selectively controlled to create lighting effects on one of said symbols at different times.

7. The machine of claim 5, wherein said lighting system provides different colors in response to said randomly selected outcome being a winning outcome.

8. The machine of claim 1, wherein said non-emissive physical object is electronic paper.

9. The machine of claim 1, wherein said non-emissive physical object is a reel strip.

10. A method of conducting a wagering game on a gaming system, the method comprising:

moving symbols on a non-emissive symbol-bearing surface through a display region, said symbols for indicating a randomly selected outcome of said wagering game;

transmitting images of said moving symbols into an image conduit having a first end and a second end opposing said first end, said first end has a curved section, said images of said moving symbols being transmitted into said second end of said image conduit; and displaying said images of said moving symbols from said first end of said image conduit such that a player perceives said images of said moving symbols to be located at said first end of said image conduit, said image conduit is configured to magnify said images such that said symbols that are displayed at said first end are larger than said symbols at said second end.

11. The method of claim 10, wherein a radius of curvature of said curved section is in the range from about 4 to 7 inches to approximate a symbol-bearing mechanical reel.

12. The method of claim 10, further including displaying, on said first end of said image conduit, of player-input symbols used for player-input for said wager game.

13. The method of claim 12, further including receiving player inputs from a touch screen overlying at least a portion of said first end of said image conduit.

14. The method of claim 10, further including transmitting light into said image conduit from a lighting device that is adjacent to said image conduit, said light enhancing the display of said symbols.

15. The method of claim 14, wherein said light is transmitted to a side surface between said first end and said second end of said image conduit, said light being selectively controllable to enhance the display of said symbols at different times.

16. A gaming system for conducting a wagering game, comprising:

a non-emissive physical object having a symbol-bearing surface with symbols thereon, said symbols being associated with said wagering game;

an image conduit located in front of said symbol-bearing surface of said non-emissive physical object and having a first end and a second end, said image conduit transmitting images of said symbols from said second end to said first end, said images of said symbols appearing at said first end such that a player perceives said symbols to be located at said first end of said image conduit; and a lighting device for producing light transmitted directly into a side surface of said image conduit to illuminate said physical object, said side surface being located between said first end and said second end.

17. The gaming system of claim 16, wherein said first end has first and second surfaces that are at different distances from said non-emissive physical object.

18. The gaming system of claim 17, wherein said symbols include outcome-indicating symbols for indicating an outcome of said wagering game, said outcome-indicating symbols appearing at said first end such that a player perceives said outcome-indicating symbols as being on said first surface.

19. The gaming system of claim 18, wherein said symbols include informational symbols that are used for providing said player with information about said wagering game, said informational symbols appearing at said first end such that a player perceives said outcome-indicating symbols as being on said second surface.

20. The gaming system of claim 19, wherein said informational symbols include at least one selected from the group consisting of a credit meter, a total-bet meter, a payline indication element, and a win meter.

21. The gaming system of claim 16, wherein said physical object and said image conduit are located within a game cabinet of a gaming machine.

22. The gaming system of claim 16, wherein said symbols includes outcome-indicating symbols for indicating an outcome of said wagering game and informational symbols that are used for providing said player with information about said wagering game.

23. The gaming system of claim 16, wherein said physical object is a reel strip that moves relative to said image conduit.

24. The gaming system of claim 16, wherein said lighting device is selectively controlled to create lighting effects on one of said symbols.

25. The gaming system of claim 24, wherein said lighting system provides different colors in response to a randomly selected outcome for said wagering game being a winning outcome.

26. The gaming system of claim 16, wherein said non-emissive physical object is electronic paper.

27. The method of claim 16, wherein said non-emissive symbol-bearing surface is electronic paper.

* * * * *